US005859595A

United States Patent [19]

Yost

[11] Patent Number: 5,859,595

[45] Date of Patent: Jan. 12, 1999

[54] SYSTEM FOR PROVIDING PAGING RECEIVERS WITH ACCURATE TIME OF DAY INFORMATION

[75] Inventor: Robert W. Yost, Conesus, N.Y.

[73] Assignee: Spectracom Corporation, E. Rochester, N.Y.

[21] Appl. No.: 740,587

[22] Filed: Oct. 31, 1996

[51] Int. Cl.[6] .................... H04M 11/00

[52] U.S. Cl. .................... 340/825.44; 340/309.15; 370/310; 368/47; 368/55

[58] Field of Search .................... 340/825.44, 311.1, 340/309.15; 370/310, 314, 350; 368/47, 55; 380/33–35, 49; 379/56.1

[56] References Cited

U.S. PATENT DOCUMENTS

| | | | |
|---|---|---|---|
| 4,117,661 | 10/1978 | Bryant, Jr. | 58/24 R |
| 4,337,463 | 6/1982 | Vangen | 340/825.3 |
| 4,358,836 | 11/1982 | Tohyama et al. | 368/47 |
| 4,713,808 | 12/1987 | Gaskill et al. | 370/94 |
| 4,845,491 | 7/1989 | Fascenda et al. | 340/825.44 |
| 4,897,835 | 1/1990 | Gaskill et al. | 370/94.1 |
| 4,926,446 | 5/1990 | Grover et al. | 375/109 |
| 5,089,814 | 2/1992 | DeLuca et al. | 340/875.49 |
| 5,168,271 | 12/1992 | Hoff | 340/825.44 |
| 5,241,305 | 8/1993 | Fascenda et al. | 340/825.44 |
| 5,285,496 | 2/1994 | Frank et al. | 380/9 |
| 5,315,635 | 5/1994 | Kane et al. | 379/57 |
| 5,345,227 | 9/1994 | Fascenda et al. | 340/825.22 |
| 5,361,397 | 11/1994 | Wright | 455/38.2 |
| 5,363,377 | 11/1994 | Sharpe | 370/100.1 |
| 5,438,326 | 8/1995 | Gordon et al. | 340/825.44 |
| 5,519,718 | 5/1996 | Yokev et al. | 375/202 |
| 5,712,867 | 1/1998 | Yokev et al. | 375/202 |

*Primary Examiner*—Michael Horabik
*Assistant Examiner*—Yonel Beaulieu
*Attorney, Agent, or Firm*—M. LuKacher; K. LuKacher

[57] ABSTRACT

A system is described for providing one or more remote paging receivers with accurate time of day information utilizing a paging provider which encodes page messages into RF signals corresponding to baseband signals for transmission via a paging channel to the receivers. The system includes the receivers and a controller. The controller sends a first page message, which defines an on-time point, to the paging provider for transmission via the paging channel to the receivers, and then sends a second page message to the paging provider for transmission via the paging channel to the receivers. Further, the controller detects the transmission of the first page message in the paging channel and determines a time of day when the on-time point of the first page message was transmitted by the paging provider in the paging channel. The second page message sent by the controller comprises data defining this determined time of day. The receivers each detect the first and second page messages in the paging channel, and have a clock for maintaining the time of day. Each of the receivers updates its clock to an accurate time of day responsive to the time of day of the clock when the on-time point of the first page message was received and the time of day defined by the data of the detected second page message. Thus, the receivers are provided with accurate time of day information for maintaining the accuracy of their clocks. In addition, such receivers may output periodically the time of day from their clocks to provide a source for accurate time of day information to other systems.

35 Claims, 2 Drawing Sheets

SYSTEM FOR PROVIDING PAGING RECEIVERS WITH ACCURATE TIME OF DAY INFORMATION

FIELD OF THE INVENTION

The present invention relates to an improved system (method and apparatus) for providing accurate time of day information to one or more paging receivers, and particularly to a system for providing accurate time of day information to one or more remote paging receivers via a paging channel supplied by a paging provider system. This invention is especially suitable for maintaining the accuracy of a real-time clock for providing time of day information (i.e., hours, minutes and seconds) at each of the receivers.

BACKGROUND TO THE INVENTION

Time of day information is conventionally sent to specialized receivers designed to receive synchronized RF time signals, such as Global Positioning System (GPS), WWVB, or Loran C signals. Such receivers can be situated at different locations within a large geographic area, and may have a real-time clock which is updated to an accurate time of day responsive to received time signals. A real-time clock is defined as an electronic clock, such as timing circuits similar to those found in digital watches, which maintains the time of day in hours, minutes, and seconds, and in some cases in fractions of a second. The clock provides an output containing time of day information. These receivers are relatively large, costly to manufacture, and may have bulky external antennas. Further, they cannot reliably receive RF time signals when located within buildings absent an extension of their external antennas. Therefore, it is desireable to provide a system for providing remote receivers with time of day information in which the receivers are relatively small, less costly to manufacture, and have real-time clocks that are maintained accurate based on time of day information sent via signals which may be received both inside and outside of buildings. Such systems have been proposed utilizing a paging receiver (also called a pager) as discussed below, but either fail to provide clocks with accurate time of day information or are based on a non-conventional design which increases manufacturing costs, or both.

In the paging industry, page messages are encoded into signals transmitted over a paging channel by a paging provider system. A paging channel is defined as a dedicated frequency for transmission of RF paging signals. Encoding is based on a paging protocol, such as POCSAG or GOLAY. These protocols are not designed to provide synchronized time signals, such as defined above, because they are limited to encoding alpha-numeric or numeric page message data. For example, POCSAG encodes page message data into eight frames of a data patch which is periodically transmitted in signals via a paging channel to pagers. Pagers are designed to decode received signals from the paging channel to obtain the encoded page message data therein. Within the encoded data, each pager is uniquely identified by a pager address, called herein a capcode. Only one of the frames of the data patch may contain encoded data with a pager's capcode. Consequently, only decoded page messages having a pager's specific capcode will be displayed to the pager's user.

These pagers often have a real-time clock for providing time of day information for time stamping received page messages. Generally, a time stamp is stored in the pager with each of received page message. Such real-time clocks may also be used to control turning on the pager's receiver responsive to preset periods during the day when signals may be sent over the paging channel to the pager. By limiting the time when the pager's receiver is active, pager battery power may be conserved. Thus, maintaining the accuracy of real-time clocks is an important consideration for pagers.

Several approaches have been proposed to maintain the accuracy of the real-time clock of a pager. In a first approach a page message with data defining the time of day is encoded into signals and transmitted via a paging channel to a pager. The pager is programmed to detect the page message as containing the correct time of day, and then updates its clock accordingly. One problem with this approach is that the received time of day is inaccurate and thereby cannot provide the correct time of day. This is due to the delays incurred before the page message is actually sent over the paging channel to the pager. This delay is based on the time the page message waits in a queue (e.g., memory buffer) with other page messages prior to being encoded, and the time it takes for encoding the page message. This delay is variable and can range for example from several seconds to minutes. Further, additional delays are incurred after the page message is sent over the paging channel due to the time lag based on the distance the signal must travel (e.g., 5 $\mu$seconds per mile) in the paging channel to the pager, and the time for decoding the page message at the pager. Another problem with this first approach is that it is very time consuming because a separate page message with the time of day must be sent to each pager. This is because each pager has a separate identifying capcode, as described above, and conventional protocols require that each page message must specify a specific capcode to uniquely identify the receiving pager. Accordingly, this first approach is unacceptable.

A second approach to sending time of day information to a pager involves sending control information to a pager having the time of day. For example, U.S. Pat. No. 4,713,808 describes a wrist watch pager which receive control packets with time of day information for updating the watch time. These control packets are separate from encoded page messages and would avoid the variable delay described above. The problem with this approach is that the control packets utilize a non-conventional paging protocol format. This increase the cost of implementing control packets in a typical pager design. Thus, this second approach is also unacceptable.

A third approach is to send time synchronization signals or pulses without data defining the time of day. Time synchronization signals are sent to a pager at predefined times of the day called on-time points, such as at midnight, synchronous with a UTC. After the pager receives a time synchronization signal or pulse, it updates its clock to the predefined time of day. One problem with this approach is that the on-time points are limited to those pre-defined with the UTC in the pager. Further, the updated clock will be inaccurate because time delays due to the distance the time synchronization signals must travel to the pager and processing time at the pager to decode the signals are not accounted for. These time delays may for example be up to several seconds. Consequently, this third approach is unacceptable where fine time resolution (e.g., resolution under 1 minute) is needed.

A fourth approach for providing time of day information to a pager is described in U.S. Pat. No. 4,845,491, issued Jul. 4, 1989, which discloses a real-time clock in a pager for time stamping received messages. The pager clock is updated based on two received time messages. Each time message has data defining the time of day (day, hour and minute)

without any specified on-time point in the message. The second of these time messages also has data defining a time correction, i.e., the difference between the time encoded in the first time message and the actual time of day when first time message was broadcasted. The time messages are each encoded into signals sent via a paging channel to a pager. The clock of the pager receives both time messages and is then updated to a corrected time of day by adding the time of day from the first time message with the time correction of the second time message, and the difference between the time of day of the pager clock when the first and second time messages were received by the pager as determined by its clock. A complex multi-recipient grouping scheme based on a non-conventional encoding protocol is also described by U.S. Pat. No. 4,845,491 to permit more than one pager to receive page messages.

There are several problems with this fourth approach. One problem is that the multi-recipient grouping scheme although allowing more than one pager to receive the time messages is complex and costly to implement because it depends on a non-conventional paging protocol. Another problem is that the updated clock time at the pager will be inaccurate for time resolutions under a minute because it fails to account for the time lag based on the distance a signal must travel in the paging channel to the pager, and the time for decoding the first and second time messages at the pager to detect them in signals in the paging channel. The time messages must be detected prior to determining their time of receipt by the pager clock. Further, the pager clock cannot be accurate to fine time resolutions since there is no specified on-time point or mark defining the exact point where the time of day in the time message is in reference to.

In light of the above four approaches, it is therefore desireable to provide a system for providing multiple paging receivers with accurate time of day information in which each of the receivers has a real-time clock that is accurately updated to a time of day with fine time resolution by accounting for all the above defined time delays. Moreover, it is desireable that the clock at each receiver is updated responsive to page messages received, in signals via a paging channel, having data encoded using conventional protocols and defining therein an on-time point.

SUMMARY OF THE INVENTION

Accordingly, it is an object of the present invention to provide an improved system (apparatus and method) for providing one or more remote (paging) receivers with accurate time of day information utilizing signals via a paging channel to the receivers and page messages encoded in such signals based on conventional paging protocols.

Another object of the present invention is to provide an improved system (apparatus and method) for providing one or more remote receivers with accurate time of day information in which a controller sends to a paging provider first and second page messages for transmission in signals via a paging channel to the receivers, the first page message having data defining an on-time point and the second page message having data defining a time of day in fixed relationship to when the on-time point of the first page message was transmitted to the receivers from the paging provider.

Another object of the present invention is to provide an improved system (apparatus and method) for providing one or more remote receivers with accurate time of day information in which the receivers can detect page messages in signals via a paging channel, and updates, responsive to such messages, a real-time clock at each receiver to an accurate time of day with fine time resolution (e.g. every 100 $\mu$seconds) by eliminating inaccuracy due to delays in transmitting messages, and accounting for delays based on the distance signals must travel to the receivers and the time taken to detect such messages from the signals.

A still further object of the present invention is to provide an improved system (apparatus and method) for providing one or more remote receivers with accurate time of day information in which each of the receivers has a real-time clock updated to the accurate time of day by the system, and in which the receivers periodically output the time of day from their clocks to provide a source of time of day information for use by other systems coupled to the receivers.

Briefly described, the present invention embodies a system for providing one or more remote paging receivers with accurate time of day information utilizing a paging provider which encodes page messages into signals for transmission via a paging channel to the receivers. The system includes the receivers and a controller. The controller provides means for sending a first page message, which defines an on-time point, to the paging provider for transmission via the paging channel to the receivers, and for sending a second page message to the paging provider for transmission via the paging channel to the receivers. Further, the controller has means for detecting the transmission of the first page message in the paging channel, and another means, responsive to this detecting means, for determining a time of day in relationship to when the on-time point of the first page message was transmitted by the paging provider in the paging channel. The second page message sent by the controller comprises data defining this determined time of day. The receivers each comprises means for detecting the first and second page messages in the paging channel, and a clock for measuring the time of day. Each of the receivers also has means for updating the clock to an accurate time of day responsive to the time of day of the clock when the on-time point of the first page message was detected and the time of day defined by the data of the detected second page message.

The present invention also embodies a method for providing one or more remote paging receivers with accurate time of day information utilizing a paging provider which encodes page messages into signals for transmission via a paging channel to the receivers. First, a first page message is sent having data defining an on-time point to the paging provider for transmission via the paging channel to the receiver. Transmission of the first page message is then detected in the paging channel. Responsive to the detected transmission of the first page message, a time of day is determined in relationship to when the on-time point of the first page message was transmitted by the paging provider. Next, a second page message is sent having data defining the determined time of day to the paging provider for transmission via the paging channel to the receiver. At the receiver, the first page message is detected in the paging channel, and then a time of day is determined when the on-time point of the first page message was detected responsive to a clock at the receiver. Thereafter, the second page message is detected in the paging channel. Once both the first and second messages have been detected by the receiver, the receiver's clock is updated to an accurate time of day responsive to the determined time of day when the on-time point of the first page message was detected at the receiver, and the time of day defined by the data of the detected second page message.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF THE INVENTION

Figure 1:
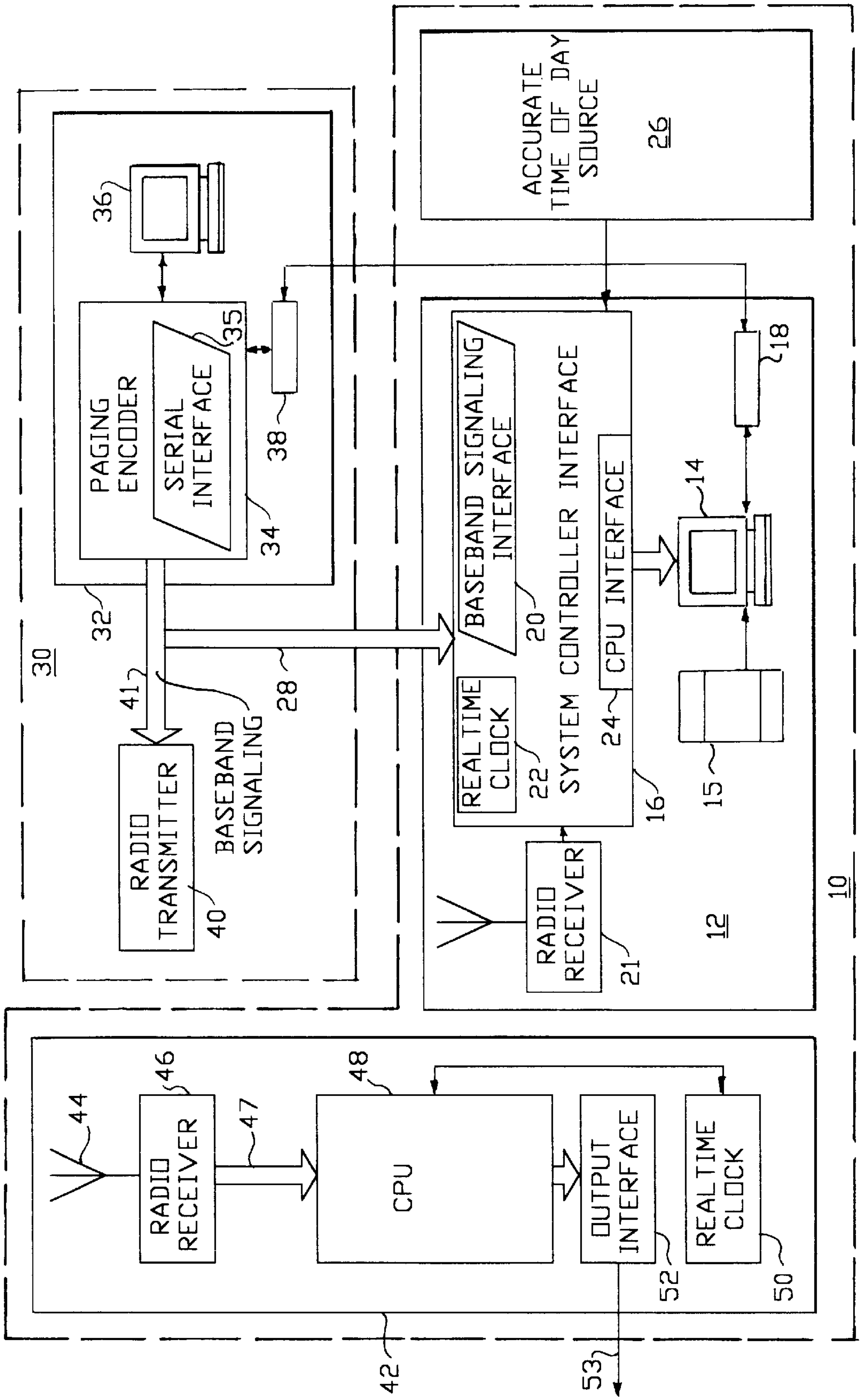
FIG. 1 is a block diagram of a system embodying the present invention.

Referring to FIG. 1, a system 10 of the present invention is shown. A system controller 12 sends page messages to one or more paging receivers (a representative one of which 42 is shown) utilizing a typical paging provider system 30. Paging provider 30 provides for transmitting received page messages to receivers 42. Paging provider 30 includes a paging service unit 32 having a paging encoder 34 for encoding page messages received over a serial interface 35. Encoding is based on a paging protocol, such as GOLAY, POCSAG, or ERMES, but application of this invention is not dependent on the particular paging protocol of encoder 34. Serial interface 35 of encoder 34 is connected to a communication port represented by a modem 38. Page messages received via serial interface 35 are first queued in a memory buffer (not shown). On a first in first out basis, page messages from the memory buffer are encoded by encoder 34. The encoded page messages represent digital data which is referred to as baseband signaling or signals. The baseband signals are arranged in a format in accordance with the encoding protocol. For example, where encoder 34 operates with POCSAG protocol, the baseband signals are in the form of a data packet with eight frame. These baseband signals are sent over a connection 41 to a radio transmitter 40 which modulates an RF signal with the baseband signals, and then transmits the RF signal (i.e., modulated baseband signals) to pagers, such as receivers 42. It may take from several seconds to minutes from the receipt of a page message via serial interface 35 until transmission of modulated baseband signals corresponding to the encoded page message by transmitter 40. Paging provider 30 may also have terminals 36 for controlling the operation of paging provider 30.

System controller 12 includes a computer or CPU 14 which controls the operation of controller 12 in accordance with programmed instructions stored in memory (not shown). Computer 14 receives signals from an interface 16, which represents circuitry for sending data input to the programmed instructions of computer 14. Interface 16 includes a baseband signaling interface 20 for receiving baseband signals from paging provider 30 via a connection 28 to connection 41 coupling encoder 34 to transmitter 40. In this manner, baseband signaling interface 20 receives substantially simultaneous baseband signals as modulated baseband signals are transmitted by transmitter 40.

A radio receiver 21 may be provided in controller 12 in the alternative to baseband signaling interface 20. Radio receiver 21 is coupled to interface 16 and is tuned to receive the RF signals transmitted by transmitter 40 in the paging channel. The paging channel represents a dedicated frequency carrying RF paging signals. The RF signals are demodulated in radio receiver 21 to provide baseband signals to interface 16. Alternatively, interface 16 may demodulate RF signals from radio receiver 21. Preferably, radio receiver 21 is located in close proximity to transmitter 40 to minimize the delay for transmitted RF signals from transmitter 40 to reach radio receiver 21.

Interface 16 also include a real-time clock 22 for maintaining an accurate time of day, including hours, minutes, and seconds with resolution in the range of 10 milliseconds to 100 $\mu$seconds. Clock 22 may also maintain the day and date, and provides an output signal (not shown) having data defining the time of day which may be sent to computer 14 via CPU interface 24. An example of clock 22 is the timekeeping circuits of a digital watch or preferably, a specialized integrated circuit with a lithium battery backup for keeping the time of day in reference to a crystal oscillator. Real-time clock 22 is periodically updated from an accurate time of day source 26 connected to interface 16. Accurate time of day source 26 is preferably synchronized to time signals, such as received by the Global Positioning System (GPS) or other similar systems. This synchronization is used to maintain the accuracy of clock 22. For example, source 26 may be a Spectracom S125 GPS disciplined oscillator.

Computer 14 sends page messages to paging provider 30 for transmission to receivers 42 using a communication interface. The communication interface is represented in FIG. 1 by a modem 18 between computer 14 and paging provider 30. However, any other communication means may be used, such as a direct serial data connection between computer 14 and serial interface 35 without modem 18 or modem 38. Further, computer 14 preferably receives power via a uninterruptible power supply (UPS) 15. UPS 15 may also provide power to other components of controller 12, and may be a conventional UPS.

Also, computer 14 detects in the baseband signals received from interface 16 (via baseband signalling interface 20 or RF signals received by radio receiver 21) page messages destined for receivers 42 by monitoring the received baseband signals, and then decoding these signals based on the protocol used by encoder 34 of the paging provider 30 to provide the page messages encoded therein. Computer 14 also receives the output of real-time clock 22. The output of real-time clock 22 is used to tag the actual time of a specific bit, or edge thereof (later referred to as the on-time point), when decoded paging messages are received.

In system 10, receiver 42 has a radio receiver 46 for receiving RF signals, i.e., modulated baseband signals transmitted over the paging channel by transmitter 40, via an internal antenna 44 which is tuned to receive these RF signals. Radio receiver 46 demodulates the RF signals from antenna 44 to recover the baseband signals. A CPU 48 is provided in receiver 42 for controlling the operation of receiver 42 in accordance with programmed instructions stored in memory (not shown). CPU 48 receives the baseband signals from receiver 46 via connection 47, and detects page messages transmitted to receiver 42 by monitoring the received baseband signals from radio receiver 46 and decoding them to provide the page messages encoded by paging provider 30 for receiver 42.

All of the receivers 42 in system 10 have the same capcode for detecting page messages in the paging channel. A capcode represents a specific pager address, such as an 18 bit binary number in POCSAG protocol, allocated by paging provider 30 for receivers 42. A page message intended for each of the receivers 42 will be encoded with this capcode. Further, computer 14 of controller 12 also uses this same capcode for detecting page messages intended for receivers 42. Thus, this capcode is referred to herein as the system capcode. Accordingly, the manner in which page messages are detected, i.e., by monitoring baseband signals and decoding messages therein, in both receivers 42 and controller 12 are similar.

In receiver 42, a real-time clock 50 is provided for maintaining the time of day. Clock 50 is similar to that of real-time clock 22 of controller 12. CPU 48 is connected to clock 50 for both updating or resetting the time of day of clock 50, and receiving signals from clock 50 representing the time of day. These signals from clock 50 are used by CPU 48 to tag the time of a specific bit, or edge thereof (later referred to as the on-time point), in a detected page message. Also these signals from clock 50 are sent by CPU 48 to an output interface 52. Output interface 52 provides output signals 53 to other digital systems (not shown) containing time of day information corresponding to clock 50. Thus, output signals 53 can provide a source of time of day information to such other digital system. These signals 53 are preferably formatted by CPU 48 in accordance with a desired data communication format, preferably RS-485 format 0, format 1, but any other data communication formats may be used, such as RS-232. In the preferred embodiment, CPU 48 sends periodically, such as every second, to output interface 52 signals representing the time of day from clock 50. Alternatively, output interface 52 may have a separate CPU to provide for formatting of output signals 53 in the desired data communication format.

Receiver 42 may be primarily powered by a battery (not shown), while a backup battery (also not shown) may be connected to clock 50 in case of primary power failure. Preferably, radio receiver 46 is always active, however it may be periodically activated by CPU 48 to conserve battery power. The configuration of receiver 42 may be in the shape which can be portable and handheld, or receiver 42 may be a component integrated into a system (not shown) which receives output signals 53.

Figure 2:
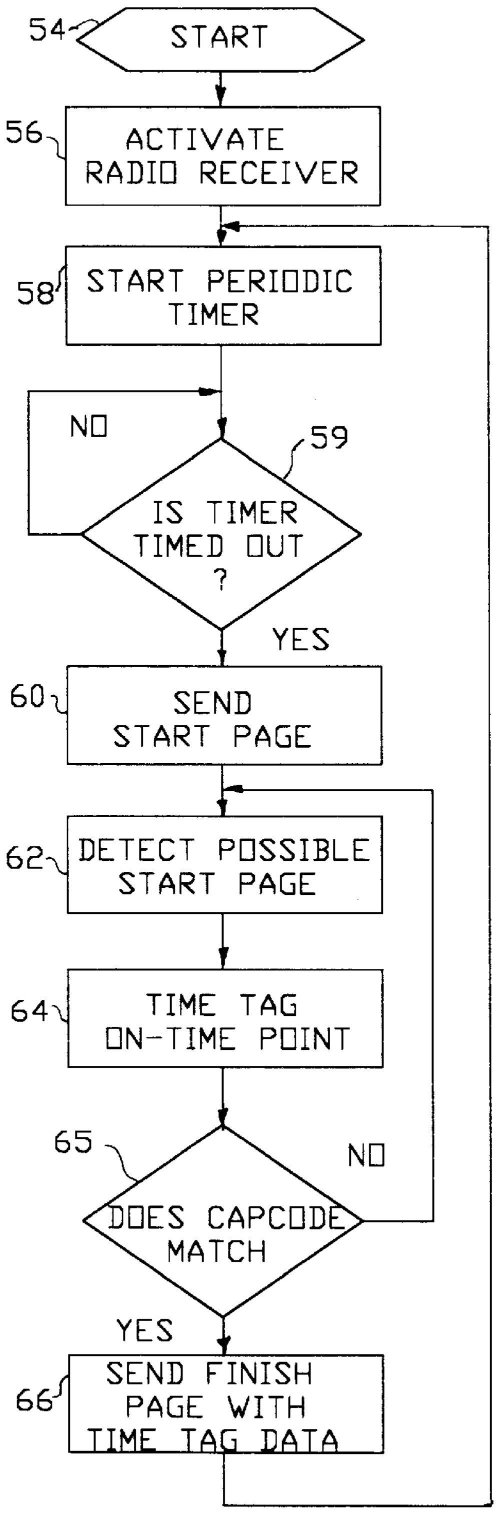
FIG. 2 is a flowchart showing the operation of a controller for the system of FIG. 1.

The operation of system 10 will now be described in connection with FIGS. 2 and 3. FIG. 2 is a flowchart showing the operation of controller 12 and the programming of CPU 14 (FIG. 1). After starting (step 54), controller 12 at step 56 activates radio receiver 21 if radio receiver 21 provides baseband signals to interface 16, otherwise processing continues to step 58 since baseband signals are already being received by baseband signaling interface 20 via connection 28. Next, a periodic timer is started in computer 14 (step 58) to provide a predefined delay. For example, the timer may be set to provide a 15 minute delay period. When the timer has expired or timed out (step 59), a first page message, called a start page, is sent to paging provider 30 via modem 18 for transmission to receivers 42 (step 60). The start page contains data defining an on-time point or marker, and is sent to paging provider 30 such that the start page, when encoded in the baseband signal has the system capcode. The on-time point in the start page is defined as the rising edge of a specific bit in the data which defines the start page, preferably its first bit. However, the on-time point could be defined in system 10 as the rising or failing edge of any bit in the start page.

Controller 12 detects at step 62 the transmission of baseband signals of the paging channel via radio receiver 21, or baseband signaling interface 20, possibly containing the start page by CPU 14 monitoring received baseband signals and decoding such signals, including signals representing the bit having the edge defining the on-time point. This represents a feedback loop or recursion since controller 12 detects transmission of its own page message.

When controller 12 detects the edge of the bit defining the on-time point in step 62, the on-time point is time tagged in reference to the time of day from clock 22 (step 64). In time tagging the on-time point, controller 12 subtracts a software correction factor from the time of day read from clock 22. This software correction factor defines a fixed duration of time for the software of controller 12 to detect the on-time point in the start page, such that the controller provides error detection and correction of the page message data, comparing of the capcode of the page message to the system capcode (later performed at step 65), and data analysis (which includes decoding). The software correction factor is fixed because the instructions performed by software in detecting the on-time point requires a fixed number of CPU cycles of CPU 14. Each CPU cycle represents one program instruction carried out by the CPU. The time is which these fixed number of cycles takes place is determinable, and is preset as the software correction factor for controller 14. Thus at step 64, the time of day of clock 22 read to time tag the on-time point is offset, i.e., subtracted, by the fixed software correction factor, such that the resulting time tag defines the actual time of day the on-time point was received by controller 14, a time of day substantially simultaneous to when the on-time point was transmitted by transmitter 40.

Next, controller 12 checks if the capcode of the message decoded at step 62 matches the system capcode (step 65). If not, then a no branch is taken back to step 62 to continue detecting a possible start page in received baseband signals. If the capcode of the decoded message matches, then it is assured that the start page has been detected, as well as the on-time point, and the system continues to step 66. Alternatively, step 65 may be combined with step 62, and detecting the start page will then include successfully matching the system capcode to the capcode of the decoded message prior to time tagging the on-time point at step 64.

At step 66, controller 12 sends a second page message, called a finish page, to paging provider 30 for transmission to receivers 42 similar to the start page. This finish page contains data defining the time tag (time tag data) of the on-time point from step 64 (step 66). Paging provider 30 encodes the finish page for transmission to receiver 42 similar to that of the start page. After sending the finish page, the periodic timer is reset at step 58 and the above procedure (steps 59–66) repeats once the timer has again timed out.

Figure 3:
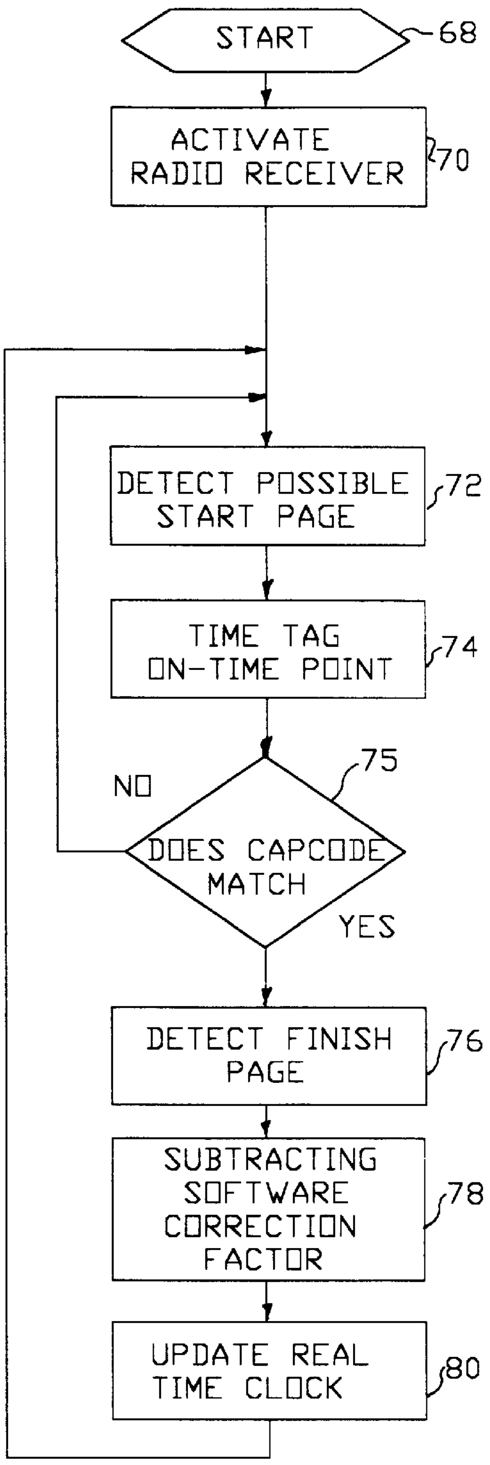
FIG. 3 is a flowchart showing the operation of each receiver in the system of FIG. 1.

FIG. 3 shows the operation of receiver 42 and particularly the programming of CPU 48 (FIG. 1). After starting (step 68), radio receiver 46 is activated by CPU 48 at step 70. Radio receiver 46 receives RF signals in the paging channel, demodulates the RF signals to provide baseband signals, and sends the baseband signals to CPU 48. Next, receiver 42 detects the transmission in the baseband signals received from radio receiver 46 possibly containing the start page (step 72) by CPU 48 monitoring the baseband signals from radio receiver 46 and decoding them, including signals representing the bit having the edge defining the on-time point. When the edge of the bit corresponding to the on-time point in the decoded message is detected, it is time tagged in reference to the time of day of clock 50 (step 74). At step 75, if the capcode of the decoded page message matches the system capcode, then receiver 42 has properly detected the start page from controller 12, as well as the on-time point. Otherwise, a no branch is taken to step 72 and CPU 48 waits to detect the next possible start page.

After the capcode of the decoded page message matches the system capcode at step 75, receiver 42 then detects the finish page by monitoring baseband signals likely to contain the finish page, decoding such signals, and determining if the page message from the decoded signals has the system capcode. At step 78, a software correction factor is subtracted from the tagged time of day of the on-time point of step 74. Like controller 12, the software correction factor defines a fixed duration of time for the software to detect the on-time point in the start page, and is fixed because the program instructions of the software at receiver 42 takes a fixed number of CPU cycles of CPU 48 to perform. Optionally, step 78 may be performed at any point after the on-time point is time tagged at step 74, for example, subtracting the software correction factor may be part of step 80 per Equation (1), as described below. Note that steps 72, 74, 75, and 78 are similar to steps 62, 64 and 65 of controller 12, and thus receiver 42 may use the same software as controller 12 for detecting the on-time point.

The data from the detected finish page, and the time tagged at step 74 are used to update clock 50 per the following equation:

$$T_{clk(new)}=T_{clk}+(T_{tag\text{-}con}-T_{tag\text{-}rec})-T_{scf}, \quad (1)$$

where:

$T_{clk(new)}$ is the correct or updated time of day for clock 50;

$T_{clk}$ is the current value of clock 50;

$T_{tag\text{-}rec}$ is the time tag of the on-time point (from step 74) at receiver 42;

$T_{tag\text{-}con}$ is the time tagged on-time point (from step 64) from the data of the finish page at receiver 42; and $T_{scf}$ is the software correction factor. The software correction factor $T_{scf}$ represents a fixed value sufficient to account for the software processing time in detecting the on-time point in the start page at receiver 42. The software correction factor is similarly used at controller 12, i.e., at step 64. Thus, the software correction factor may be viewed as a means to calibrate system 10 to assure that all delays due to software processing at both controller 12 and receivers 42 are accounted for in the updated time of day at the receivers.

Clock 50 is updated to $T_{clk(new,)}$ by CPU 48 by resetting the absolute time of day of clock 50 to $T_{clk(new)}$ per Equation (1). After clock 50 is updated, the above procedure (steps 72–80) repeat by returning to step 72, where receiver 42 waits to detect the next possible start page. Note that although not shown, the time of clock 50 is periodically outputted via output signals 53.

In the preferred embodiment, step 66 in FIG. 2 may also include encrypting the time tag data prior to sending the finish page to the paging provider 30 for transmission to receivers 42. Further, step 80 in FIG. 3 will then include decrypting the data from the detected finish page prior to updating clock 50. Software for encrypting the time tag data may be provided in computer 14 of controller 12, while CPU 48 of receiver 42 may be provided software for decrypting the data from the finish page.

In addition, multiple receivers 42 of system 40 are remote from paging provider 30 and will be within a geographic area centered near radio transmitter 40 which defines the coverage area for transmitted RF signals. It takes approximately 5 μseconds per mile for RF signals from transmitter 40 to reach receivers 42. Thus, there is a time delay based on the distance from transmitter 40. To account for this time delay, an average compensation factor is added to the data defining the time tag in the finish page. The average compensation factor has a value equal to the maximum possible delay within the coverage area divided by two. For example, if the furthest a receiver 42 may be from radio transmitter 40 is within a ten mile radius, then the maximum possible time delay for RF signals to be received at a receiver 42 is 50 μsec, the average compensation factor is 25 μsec, and 25 μsec would be added to the time of day data defined in the finish page. The average compensation factor may alternatively be a term added to Equation (1) to update clock 50 at receiver 42. Further, in another alternative where a particular receiver 42 is stationary from transmitter 40, the compensation factor may be a term added to Equation (1) to update clock 50 at this receiver which represents the actual time it takes for baseband signals to be received rather than an average time.

Furthermore, if radio receiver 21 in controller 12 is used to receive baseband signaling, an additional time delay may be added to the time of day data defined in the finish page which is based on the fixed delay to receive RF signals from transmitter 40.

As described above, clock 50 of receiver 42 is updated with accurate time of day information with a time resolution of up to 100 μseconds, because by sending to receiver 42 in the finish page the time of day of the transmission of the on-time point in the start page from provider 30 eliminates the delay in provider 30 for queuing and encoding the start page. Further, clock 50 is updated with accurate time of day information with fine time resolution by both accounting for delays due to software processing (i.e., software correction factor) at both controller 12 and receiver 42, and adding an average compensation factor to the time of day data of the finish page to minimize the delay due to distance the start page must travel in RF signals from transmitter 40 to receiver 42 (i.e., radio receiver 46). Note that the on-time point detected by receiver 42 from the start page in reference to time of day data from the finish page assures the accuracy of clock 50 because it fixes an exact marker in the start page via a bit edge.

From the foregoing description it will be apparent that there has been provided an improved system and method for providing one or more remote paging receivers with accurate time of day information. Variations and modifications of the herein described system or method and other applications for the invention will undoubtedly suggest themselves to those skilled in the art. Accordingly, the foregoing description should be taken as illustrative and not in a limiting sense.

What is claimed is:

1. A system for providing one or more remote receivers with accurate time of day information utilizing a paging provider which encodes page messages into signals for transmission via a paging channel to said receivers, said system comprising:

said receivers and a controller;

said controller comprising means for sending a first page message which defines an on-time point to said paging provider for transmission via said paging channel to said receivers and for sending a second page message to said paging provider for transmission via said paging channel to said receivers, means for detecting the transmission of said first page message in said paging channel, and means responsive to said detecting means of said controller for determining a time of day when the on-time point of said first page message was transmitted by said paging provider in said paging channel, wherein said second page message comprises data defining said time of day from said determining means; and said receivers each comprising means for detecting said first and second page messages in said paging channel, a clock for measuring the time of day, means responsive to said detecting means of said receiver and said clock for determining a time of day when said on-time point of said first page message was received from said paging provider in said paging channel, and means for updating said clock to an accurate time of day responsive to the determined time of day when said on-time point of said first page message was received and the time of day defined by said data of the detected second page message.

2. The system according to claim 1 wherein said controller further comprises means for encrypting said data of said second page message which defines said time of day from said determining means prior to said second page message being sent, and said receivers each further comprising means for decrypting said data from the detected second page message prior to the clock of the receiver being updated.

3. The system according to claim 1 wherein said clock at each of the receivers is a real-time clock.

4. The system according to claim 1 wherein said determining means of said controller further comprises:

a source for accurate time of day information;

a clock for measuring the accurate time of day which is set responsive to said accurate time of day information from said source; and means for determining a time of day responsive to said clock of said controller when the on-time point of said first page message was transmitted by said paging provider in said paging channel.

5. The system according to claim 1 wherein said detecting means of said controller further comprises means for monitoring signals of said paging channel, and decoding these signals to detect said first page message which was encoded by said paging provider.

6. The system according to claim 1 wherein said detecting means of each of said receivers further comprises means for monitoring signals of said paging channel, and decoding these signals to detect said first and second page messages which were encoded by said paging provider.

7. The system according to claim 1 wherein said receivers each further comprise means for outputting the time of day of the clock of the receiver.

8. The system according to claim 1 wherein said updating means for the clock at each of said receivers further comprises means for updating said clock to a time of day equal to the time of day of the clock plus the difference between the time of day when said on-time point of said first page message was detected by the receiver and the time of day defined by said data of the detected second page message, and a correction factor sufficient to account for delays caused by said detecting means of each of said receivers.

9. The system according to claim 1 wherein said controller further comprises means for adding to said time of day defined by said data a delay responsive to the time said first page message takes to reach said receivers in signals via said paging channel.

10. The system according to claim 1 wherein said sending means, detecting means, and determining means of the controller are enabled periodically.

11. The system according to claim 1 wherein:

said detecting means of said controller further comprises means for detecting said on-time point of said first page message in said paging channel in a preset fixed duration of time; and said determining means of said controller further comprises a clock at said controller measuring the time of day, and means for reading the time of day from the clock of said controller and subtracting said preset fixed time to provide the time of day when the on-time point of said first page message was transmitted by said paging provider in said paging channel.

12. The system according to claim 1 wherein:

said detecting means of said each of said receivers further comprises means for detecting said on-time point of said first page message in said paging channel in a preset fixed duration of time; and said determining means of each of said receivers further comprises means for reading the time of day from the clock of said receiver and subtracting said preset fixed time to provide the time of day when the on-time point of said first page message was received from said paging provider in said paging channel.

13. The system according to claim 1 wherein said updating means for the clock at each of said receivers is further responsive to a correction factor sufficient to account for delays caused by said detecting means of said receiver, and a delay responsive to the time said first page message takes to reach said receiver in signals via said paging channel.

14. The system according to claim 1 wherein said first page message comprises bits of data, and said on-time point represents the rising or falling edge of one of said bits in said first page message.

15. The system according to claim 1 wherein at least one of said receivers comprises means for outputting the time of day of the clock of the receiver to another system to provide a source of time of day information for said another system.

16. A method for providing one or more remote receivers with accurate time of day information utilizing a paging provider which encodes page messages into signals for transmission via a paging channel to said receivers, said method comprising the steps of:

(a) sending a first page message having data defining an on-time point to said paging provider for transmission via said paging channel to said receiver;

(b) detecting the transmission of said first page message in said paging channel;

(c) determining, responsive to step (b), a time of day when the on-time point of said first page message was transmitted by said paging provider;

(d) sending a second page message having data defining said determined time of day from step (c) to said paging provider for transmission via said paging channel to said receiver;

(e) detecting at said receiver said first page message in said paging channel;

(f) determining at said receiver a time of day when said on-time point of said first page message was detected responsive to a clock at said receiver;

(g) detecting at said receiver said second page message in said paging channel; and (h) updating at said receiver said clock to an accurate time of day responsive to said determined time of day when said on-time point of said first page message was detected at the receiver and the time of day defined by said data of said detected second page message.

17. The method according to claim 16 further comprises the steps of encrypting said data which defines said determined time of day from step (c), and said sending step further comprises the step of sending a second page message having said encrypted data to said paging provider for transmission via said paging channel to said receiver, and said updating step further comprises the step of decrypting at said receiver said encrypted data of said second page message.

18. The method according to claim 16 wherein said clock is a real-time clock.

19. The method according to claim 16 wherein said step of detecting the transmission of said first page message from said paging provider further comprises the steps of monitoring signals of said paging channel, and decoding these signals to detect said first page message which was encoded by said paging provider.

20. The method according to claim 16 wherein said steps (e) and (g) for detecting at said receiver said first and second page messages, respectively, each further comprise the steps of monitoring signals of said paging channel, and decoding these signals to detect said first and second page messages, respectively, which were encoded by said paging provider.

21. The method according to claim 16 wherein said step of determining, responsive to step (b), a time of day when the on-time point of said first page message was transmitted by said paging provider further comprises the step of determining, responsive to a clock corresponding to the actual time of day, a time of day in relationship to when the on-time point of said received first page message was transmitted to said receiver.

22. The method according to claim 16 wherein said updating step further comprises updating the clock to a time of day equal the time of day of the clock plus the difference between the determined time of day when the on-time point of the first page message was received and the time of day defined by said data of said detected second page message, and a correction factor sufficient to account for delays in carrying out step (e).

23. The method according to claim 16 further comprising the step of adding a time delay to said time defined by said data of said second page message responsive to the time said first page message take to reach said receiver in signals via said paging channel.

24. The method according to claim 16 further comprising the step of outputting a signal from said receiver responsive to the time of day of said clock.

25. The method according to claim 16 wherein steps (a) through (d) are carried out periodically.

26. The method according to claim 16 wherein said step (b) further comprises the step of detecting said on-time point of said first page message in said paging channel in which said detecting step is carried out in a preset fixed duration of time; and said step (c) further comprises the step of reading the time of day from a clock and subtracting said preset fixed time from said read time of day to provide the time of day when the on-time point of said first page message was transmitted by said paging provider in said paging channel.

27. The method according to claim 16 wherein said step (e) further comprises the step of detecting said on-time point of said first page message in said paging channel in which said detecting step is carried out in a preset fixed duration of time; and said step (f) further comprises the step of reading the time of day from said clock and subtracting said preset fixed time from said read time of day to provide the time of day when the on-time point of said first page message was received from said paging provider in said paging channel.

28. The system according to claim 16 wherein said first page message comprises bits of data, and said on-time point represents the rising or falling edge of one of said bits in said first page message.

29. A system for providing one or more remote receivers with accurate time of day information utilizing a paging provider, said system comprising:

a controller comprising means for sending a first page message having an on-time point to said paging provider for transmission to said receivers, means for determining the time of day when said paging provider transmitted said on-time point of said first page message to said receivers, and means for sending a second page message comprising data defining said time of day from said determining means to said paging provider for transmission to said receivers.

30. The system according to claim 29 wherein said determining means further comprises:

a source for accurate time of day information; and a clock for measuring the time of day which is set responsive to said accurate time of day information from said source.

31. The system according to claim 29 further comprising means for encrypting said data before said second page message is sent.

32. The system according to claim 29 wherein said first page message comprises bits of data, and said on-time point represents the rising or falling edge of one of said bits in said first page message.

33. A receiver for receiving accurate time of day information from a first page message having data defining an on-time point and a second page message having data defining the time of day when said on-time point of said first page message was transmitted to the receiver, said receiver comprising:

a clock for measuring the time of day;

means for detecting said first and second page messages in said paging channel;

means for determining the time of day when said on-time point of said first page message was received with respect to said clock; and means for updating said clock to an accurate time of day responsive to said time of day from said determining means and the time of day defined by said data of said second page message.

34. The receiver according to claim 33 further comprising means for decrypting said data of said second page message when said data is encrypted.

35. The receiver according to claim 33 wherein said receiver further comprise means for outputting the time of day of the clock.

* * * * *